(12) United States Patent
Bankert et al.

(10) Patent No.: US 6,965,904 B2
(45) Date of Patent: Nov. 15, 2005

(54) QUERY SERVICE FOR ELECTRONIC DOCUMENTS ARCHIVED IN A MULTI-DIMENSIONAL STORAGE SPACE

(75) Inventors: William E. Bankert, Livermore, CA (US); Jean-Luc Chatelain, Pleasanton, CA (US); Philippe Ciampossin, Sunnyvale, CA (US); Eric Rodriguez, Pleasanton, CA (US); David Lee Smith, Tokyo (JP); Amit Tewari, Newark, CA (US)

(73) Assignee: Zantaz, Inc., Pleasanton, CA (US)

( * ) Notice: Subject to any disclaimer, the term of this patent is extended or adjusted under 35 U.S.C. 154(b) by 368 days.

(21) Appl. No.: 09/798,257

(22) Filed: Mar. 2, 2001

(65) Prior Publication Data

US 2002/0123999 A1 Sep. 5, 2002

(51) Int. Cl.[7] .............................................. G06F 17/30
(52) U.S. Cl. .................................................... 707/104.1
(58) Field of Search ............................... 707/100, 102, 707/104.1, 203, 204, 6, 1

(56) References Cited

U.S. PATENT DOCUMENTS

| | | | |
|---|---|---|---|
| 5,040,142 A | | 8/1991 | Mori et al. |
| 5,555,346 A | | 9/1996 | Gross et al. |
| 5,583,983 A | * | 12/1996 | Schmitter .................... 717/138 |
| 5,659,746 A | | 8/1997 | Bankert et al. |
| 5,717,868 A | | 2/1998 | James |
| 5,732,214 A | * | 3/1998 | Subrahmanyam ........... 709/227 |
| 5,734,893 A | | 3/1998 | Li et al. |
| 5,742,668 A | | 4/1998 | Pepe et al. |
| 5,765,033 A | | 6/1998 | Miloslavsky |
| 5,778,378 A | | 7/1998 | Rubin |
| 5,793,497 A | | 8/1998 | Funk |
| 5,793,888 A | | 8/1998 | Delanoy |
| 5,806,061 A | | 9/1998 | Chaudhuri et al. |
| 5,809,455 A | * | 9/1998 | Nishiguchi et al. ......... 704/214 |
| 5,838,685 A | | 11/1998 | Hochman |
| 5,936,624 A | * | 8/1999 | Lisle et al. .................. 345/835 |
| 6,052,709 A | | 4/2000 | Paul |
| 6,078,921 A | | 6/2000 | Kelley |
| 6,104,394 A | * | 8/2000 | Lisle et al. .................. 345/765 |
| 6,134,315 A | | 10/2000 | Galvin |
| 6,134,549 A | * | 10/2000 | Regnier et al. ................. 707/9 |
| 6,147,977 A | | 11/2000 | Thro et al. |
| 6,167,402 A | | 12/2000 | Yeager |
| 6,182,080 B1 | | 1/2001 | Clements |
| 6,182,118 B1 | | 1/2001 | Finney et al. |
| 6,298,342 B1 | * | 10/2001 | Graefe et al. .................. 707/4 |

OTHER PUBLICATIONS

Beard, M. Kate et al., "Multilevel and Graphical Views of Metadata," 1998 IEEE International Forum on research and Technology Advances in Digital Libraries, Apr. 1998, pp. 256–265, ISBN 0–8186–8464–X, IEEE, USA.

(Continued)

*Primary Examiner*—Safet Metjahic
*Assistant Examiner*—Sana Al-Hashemi
(74) *Attorney, Agent, or Firm*—Richard A. Dunning, Jr.

(57) ABSTRACT

A method and computer program product for locating data in a system including a plurality of archive units, and answering a query directed to an archive unit. Locating includes broadcasting a query to all the archive units; identifying a set of the archive units that could contain a result for the query; receiving at least one query reply from the archive units; and validating the query reply when the archive unit that sent the query reply is in the set. Answering includes receiving the query; responding to the query when the archive unit could contain a result for the query; and discarding the query without responding when the archive unit could not contain a result for the query.

10 Claims, 10 Drawing Sheets

OTHER PUBLICATIONS

Ishikawa, Hiroshi et al., "Document Warehousing Based on a Multimedia Database System," Data Engineering, 1999, Proceedings, 15$^{th}$ International Conference on Data Engineering, Mar. 23, 1999, pp. 168–173, ISBN 0-7695-0071, IEEE, USA.

Jicheng, Wang et al., "Web Mining: Knowledge Discovery on the Web," 1999 IEEE Systems, Man and Cybernetics International Conference, Oct. 1999, pp. II–137–II–141, ISBN 0-7803-5731-0, IEEE, USA.

European Patent Office, "Supplementary European Search Report," Jan. 29, 2003, cover sheet plus 3 pages, Reference P014654EP, European Patent Office, Munich.

Ishikawa et al., "Document Warehousing Based on a Multimedia Database System," 15$^{th}$ International Conference on Data Engineering, Apr. 1999, pp. 168–173, IEEE, USA.

Jicheng et al., "Web Mining: Knowledge Discovery on the Web," IEEE International Conference, 1999, pp. 137–141, vol. II, IEEE, USA.

Beard et al., "Multilevel and Graphical Views of Metadata," IEEE Advances in Digital Libraries Conference, 1998, pp. 256–265, IEEE, USA.

* cited by examiner

QUERY SERVICE FOR ELECTRONIC DOCUMENTS ARCHIVED IN A MULTI-DIMENSIONAL STORAGE SPACE

CROSS-REFERENCE TO RELATED APPLICATIONS

The present application is based on, and claims priority from, U.S. patent application Ser. No. 09/484,085, filed Jan. 18, 2000.

BACKGROUND

Field of the Invention

The present invention relates generally to methods for storage and retrieval of data, and more specifically to a query service for electronic documents archived in a multi-dimensional storage space.

Electronic commerce is fast becoming the method of choice for doing business. This trend demands a way to document electronic business transactions. Conventionally, commercial transactions are documented on paper records. In order to facilitate permanent storage and ready retrieval, business spends billions each year on filing, storing, and retrieving these paper documents.

One advantage of electronic commerce is that it greatly reduces reliance on such paper documents, and the accompanying costs of handling them. Instead, electronic documents are used to execute and record electronic transactions. However, the need for accurate, permanent, and available records of these electronic transactions remains.

One conventional solution to this problem is hierarchical storage management (HSM). HSM is a method for management of file backup and archive in a way that uses storage devices economically. The hierarchy represents different types of storage media, such as a redundant array of independent disks systems, optical storage, or tape, each type representing a different level of cost and distance (speed of retrieval) when access is needed. For example, as a file ages in an archive, it can be automatically moved to a slower but less expensive form of storage.

A primary disadvantage of HSM is that the distance from a user to his data can differ depending on the age of the data. In general, users prefer that all of their data be equidistant.

SUMMARY

In general, in one aspect, the invention features a method and computer program product for locating data in a system including a plurality of archive units. It includes broadcasting a query to all the archive units; identifying a set of the archive units that could contain a result for the query; receiving at least one query reply from the archive units; and validating the query reply when the archive unit that sent the query reply is in the set.

Particular implementations can include providing an error indication when a query reply is not received from one of the archive units in the set.

In general, in one aspect, the invention features a method and computer program product for locating data in a system including a plurality of archive units and a storage map, wherein the storage map locates the archive units in a multi-dimensional storage space having a metadata axis and a bias data axis. It includes broadcasting a query to all the archive units; identifying a set of the archive units that fall within a bias data range and a metadata range specified by the query; receiving at least one query reply from the archive units; and validating the query reply when the archive unit that sent the query reply is in the set.

Particular implementations can include providing an error indication when a query reply is not received from one of the archive units in the set.

In general, in one aspect, the invention features an apparatus. It includes a plurality of archive units; and a metaserver configured to broadcast a query to all the archive units, identify a set of the archive units that could contain a result for the query, receive a query reply from at least one of the archive units, and validate the query reply when the archive unit that sent the query reply is in the set.

In general, in one aspect, the invention features an apparatus for archiving data. It includes a plurality of archive units; and a metaserver having a storage map locating the archive units in a multi-dimensional storage space having a metadata axis and a bias data axis, the metaserver configured to broadcast a query to all the archive units, identify a set of the archive units that fall within a metadata range and a bias data range specified by the query, receive a query reply from at least one of the archive units, and validate the query reply when the archive unit that sent the query reply is in the set.

In general, in one aspect, the invention features a computer-implemented method and computer program product for use in answering a query directed to an archive unit. It includes receiving the query; responding to the query when the archive unit could contain a result for the query; and discarding the query without responding when the archive unit could not contain a result for the query.

Particular implementations can include one or more of the following. It includes examining an index describing the data stored in the archive unit to determine whether the archive unit could contain a result for the query. The index locates the archive unit in a multi-dimensional storage space having a metadata axis and a bias data axis, and examining includes comparing to the index a metadata range and a bias data range specified by the query.

In general, in one aspect, the invention features an apparatus. It includes a memory unit configured to store data; an index unit configured to describe the data stored in the memory unit; and a processor configured to receive a query, respond to the query when the metadata indicates that the data stored in the memory could contain a result for the query, and discard the query without responding when the metadata indicates that the data stored in the memory unit could not contain a result for the query.

Particular implementations can include one or more of the following. The processor is further configured to examine the index to determine whether the archive unit could contain a result for the query. The index locates the archive unit in a multi-dimensional storage space having a metadata axis and a bias data axis, and wherein the processor is further configured to compare to the index a metadata range and a bias data range specified by the query.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Conventional archiving solutions generally employ a single large database for storage and retrieval. Consequently, these conventional mechanisms must search the entire database whenever an electronic document must be retrieved. This factor limits the effective size and speed of conventional archiving mechanisms.

Figure 1:
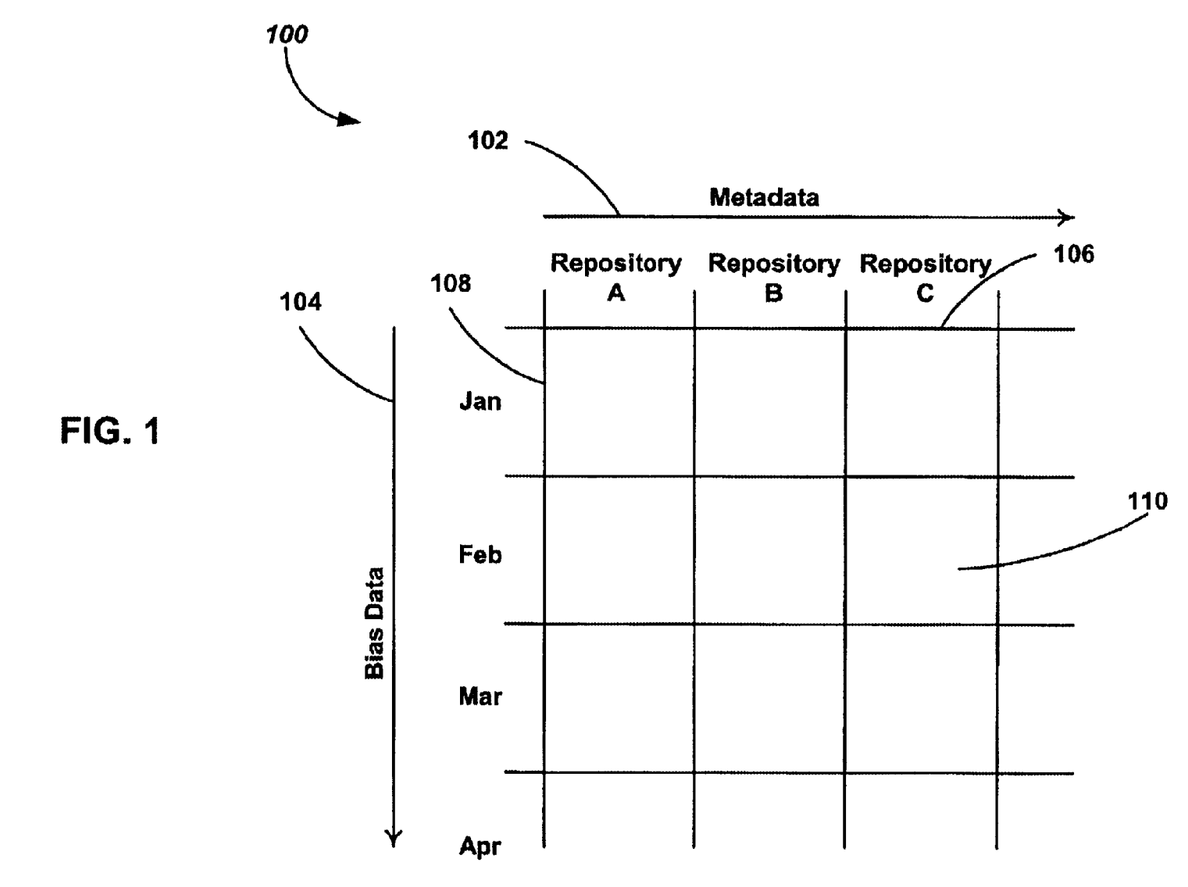
FIG. 1 depicts a multi-dimensional storage space according to one implementation of the present invention.

In contrast, implementations of the present invention employ a subdivided database, referred to as a multi-dimensional storage space. One such multi-dimensional storage space 100 is depicted in FIG. 1. Storage space 100 is divided according to implementations of the present invention by two axes. One axis is referred to as "metadata" axis 402, and the other axis is referred to as "bias data" axis 104. Axes 102 and 104 define two dimensions of multi-dimensional storage space 100. Storage spaces including further dimensions and axes are within the scope of the present invention.

Each axis divides its associated dimension of the storage space into a plurality of "bins." For example, metadata axis 102 divides space 100 into a plurality of metadata bins 106. In the example of FIG. 1, metadata describes particular repositories. A repository is a "slice" of the data space that can be assigned to a particular customer. In the example of FIG. 1, each metadata bin refers to a particular repository. In FIG. 1, three repositories A, B, and C are depicted. Likewise, bias data axis 104 divides the bias data dimension of storage space 100 into a plurality of bias data bins 108. In the example of FIG. 1, each bias data bin corresponds to a month of the year.

The intersection of a bias data bin and a metadata bin define a "cell" 110 within storage space 100. When an electronic document arrives at the archive, it is associated with one or more cells 110 according to one or more "routing rules," as discussed in detail below. According to one implementation, storage space 100 refers to a physical storage space, and electronic documents are actually stored within the physical cells within that storage space. In another implementation, storage space 100 refers to a logical storage space, or "storage map." While each electronic document is stored on a physical device, a pointer to that storage location is associated with the storage map cell or cells that were associated with that electronic document by the operation of the routing rule. In this manner, each electronic document is stored only once, but may be associated with two or more cells.

An advantage of this subdivided approach lies in the speed of retrieval of documents from the archive. When a user wishes to retrieve a document from the archive, the user specifies one or more cells in the storage space to be searched. In contrast to conventional database archive systems, only the electronic documents associated with the selected cells need to be searched. This method increases the speed and efficiency of the retrieval.

As mentioned above, each electronic document is assigned, on receipt of the archive, to one or more cells within the storage space. This association between electronic documents and cells is implemented according to one or more routing rules. A routing rule creates the association based on user-specified criteria. In one implementation, the user is permitted to edit the routing rule directly. An Internet-based interface is provided to permit the definition of routing rules by users.

Each routing rule specifies at least one meta variable and at least one bias variable. For each variable, the routing rule specifies at least one value, and the action to be taken when an electronic document is received containing that value for that variable. For example, a routing rule for a particular customer may specify that each electronic document it archives is to be associated with both the month in which it is sent, and the month in which it is archived. Therefore, if the customer archives an electronic document that was sent in January and archived in March, it will be associated with the bias data bins for January and March. In addition, the routing rule for the customer may specify that each electronic document archived is to be associated with the repository corresponding to that customer. For example, a customer may specify repository A. Then when the document is archived, it is associated with the cells in the repository A metadata bin corresponding to January and March.

When a customer wishes to retrieve an archived document, the customer can specify one or more cells within the data space. For example, a customer may wish to retrieve the document archived in the above example. Therefore, the customer specifies the cell in repository A associated with the month of January. The customer then specifies certain search criteria. The archive then searches the specified cell using the user-specified search criteria to obtain search results. The search results are displayed to the user as an HTML document. The user can select a particular search result as a target. The archive then sends a copy of the target electronic document to the user.

Routing rules are also useful in retrieving documents. For example, a routing rule can be written after certain electronic documents are stored to create a new repository containing a particular subset of those documents. For example, an SEC audit may require all of the emails that were sent to Joe Smith by the customer of repository A during February. A new routing rule can be generated very easily that will quickly populate a repository (for example, repository B) with only these emails. The routing rule specifies that all of the electronic documents associated with repository A for the month of January (bias data bin January) be searched for emails sent to Joe Smith. The routing rule then searches the cell associated with the January bias data bin and the repository A metadata bin for emails sent to Joe Smith by the customer. The resulting search results are then associated with repository B. A key benefit of this method of retrieval is that an audited company need only produce those documents that match the scope of the audit, rather than producing all of the documents that might match the scope of the audit (for example, producing all emails sent during the month of January).

Implementations of the present invention also take advantage of the fact that not all data is equally likely to be accessed. In particular, the longer an electronic document has been stored, the less likely it is to be retrieved. Therefore, in one implementation, data is moved to successively less expensive storage media as it ages. Such media reduced the costs of storage, but increased the costs of retrieval. However, because the odds of retrieval are low, savings are achieved.

One implementation of the present invention provides for multi-level indexing. Referring to FIG. 1, each cell within storage space 100 is further subdivided into multiple subcells. This allows for further data segmentation based on a hash function or other system generated criteria.

Figure 2:
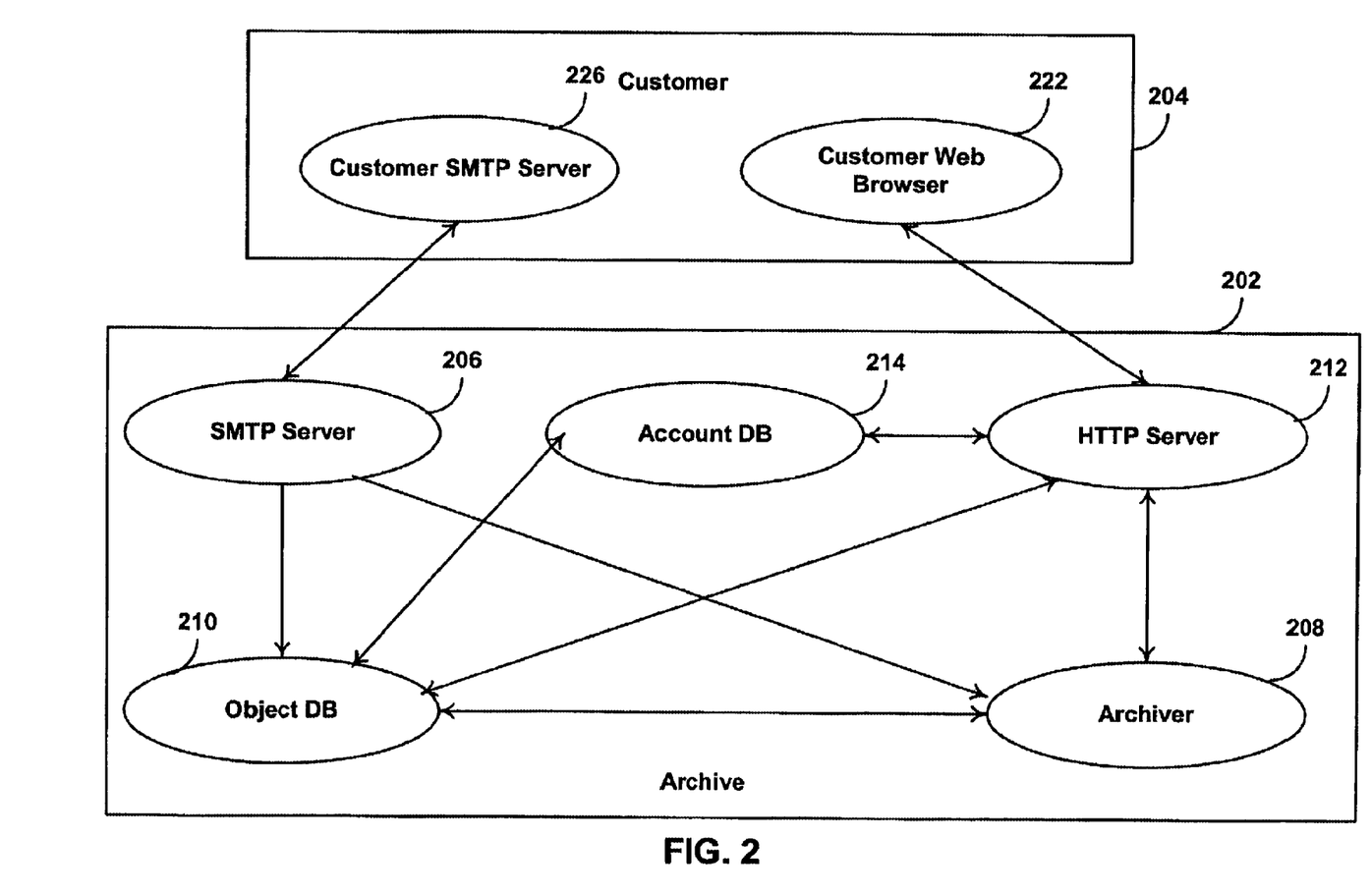
FIG. 2 is a block diagram depicting a customer and an archive according to an implementation of the present invention.

FIG. 2 is a block diagram depicting a customer 104 and an archive 102 according to an implementation of the present invention. In the discussed implementation, the customer exchanges electronic documents with third parties using customer SMTP server 226. Electronic documents to be archived are sent to archive 102 by customer SMTP server 226 and received by archive SMTP server 206. Customer 104 uses a customer web browser 222 to retrieve archived documents. Interaction with browser 222 is handled by HTTP server 212 at the archive. The electronic documents are physically stored by archiver 208. The storage and retrieval of these electronic documents is managed by object database 210.

Figure 3:
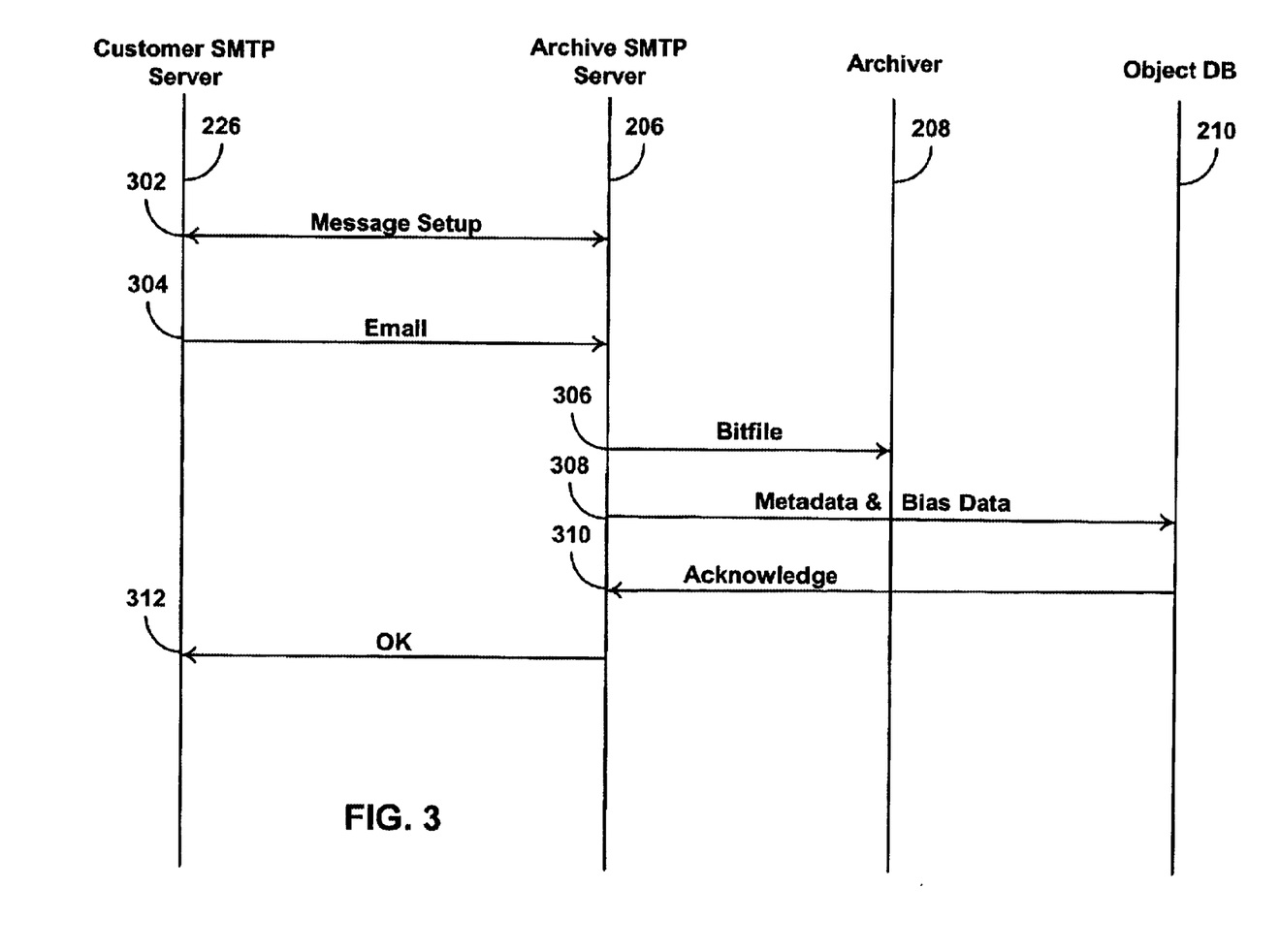
FIG. 3 is a flow diagram depicting the electronic document storage operation according to an implementation of the present invention.

FIG. 3 is a flow diagram depicting the electronic document storage operation according to an implementation of the present invention. The process begins with a message setup exchange 302 between customer SMTP server 226 and archive SMTP server 206. Such message setup exchanges are well-known in the relevant arts. Next, the electronic document to be archived is transferred from the customer SMTP server to the archive SMTP server as an email 304. The archive SMTP server sends the electronic document to archiver 208 for storage as a bitfile at 306. In one implementation, the bitfile is immediately written to a WORM disk to ensure non-tamperability.

The archive server also parses the electronic document to extract metadata and bias data values for the electronic document. The metadata can be extracted from the header of the email. If the document is sent by electronic data interchange (EDI), the metadata can be extracted from specific fields within the EDI form. These values are sent to the object database 210 at 308. The object database applies routing rules to the metadata and bias data to place pointers to the electronic document in particular cells within the storage space. The metadata can be used with the account database to identify a repository associated with the customer associated with the electronic document, as described below.

When this process is complete, the object database sends and acknowledge message to the archive SMTP server at 310. In turn, the archive SMTP server sends an OK message to the customer SMTP server at 312.

Figure 4:
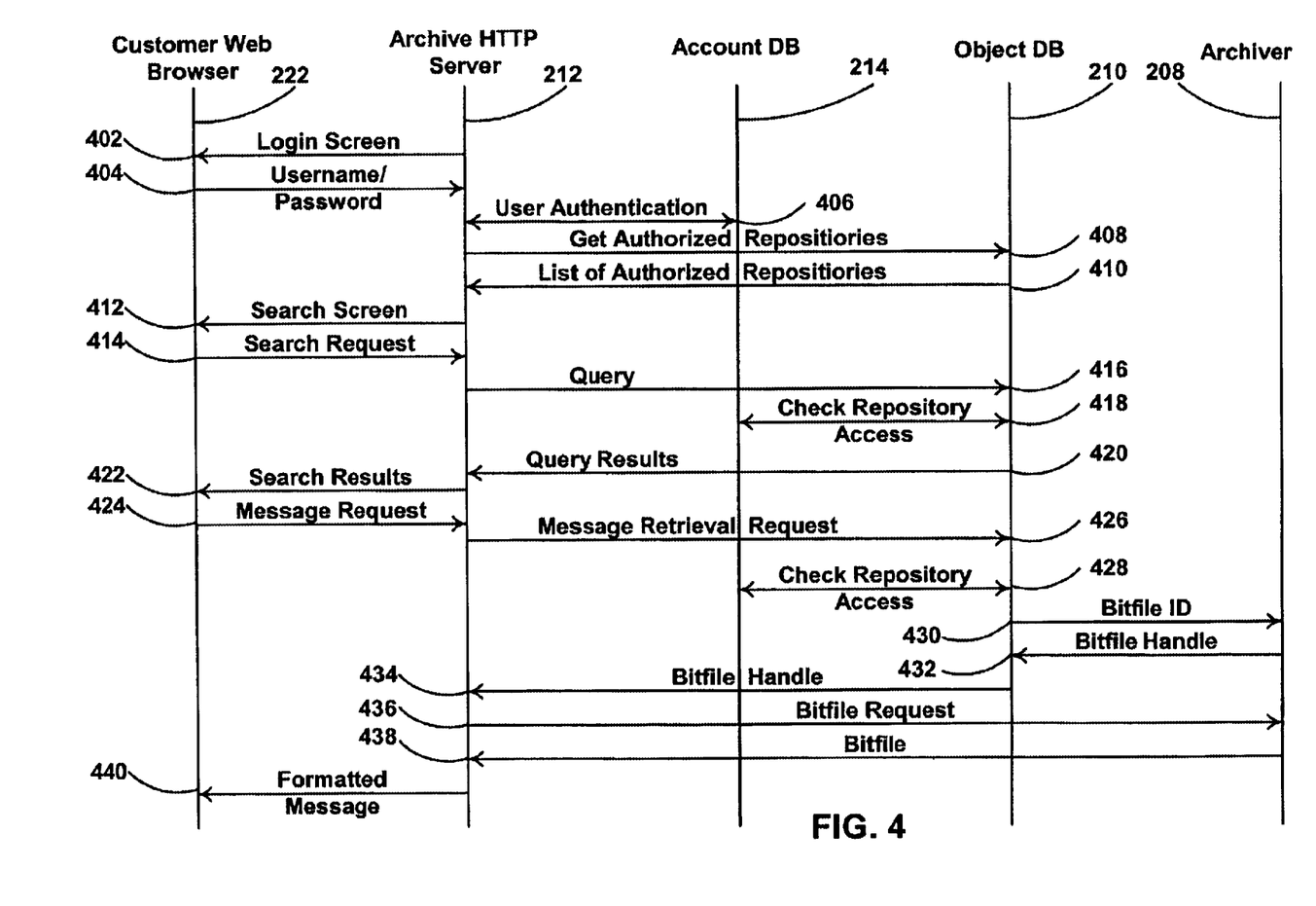
FIG. 4 is a flow diagram depicting an electronic document retrieval operation according to one implementation of the present invention.

FIG. 4 is a flow diagram depicting an electronic document retrieval operation according to one implementation of the present invention. When customer web browser 222 is pointed to the home page of HTTP server 212, a login screen is sent to the customer browser at 402. The customer browser provides a username and password to access the archive at 404. Account database 214 conducts a user authentication process 406 to verify the identity of the customer. When the customer has been authenticated, the archive HTTP server contacts object database 210 to obtain a list of the repositories to which the customer has access at 408. The list is returned to the archive server at 410.

The archive HTTP server composes a search screen containing the list of authorized repositories, and sends the search screen to the customer browser at 412. The customer uses the screen to compose a search request by selecting particular repositories and entering search criteria and optionally bias data. The search request is sent to the archive at 414.

The archive HTTP server formulates a query based on the search request, and transmits this query to the object database at 416. For security reasons, the object database confirms that the customer is authorized to access the repositories specified in the query at 418. The object database executes the query to generate a set of query results, which are sent to the archive HTTP server at 420. The archive HTTP server composes a search results screen, which is transmitted to the customer at 422. The search screen includes one or more results that match the customer's search request. The customer selects one or more of these search results as "targets." These targets are sent to the archive HTTP server as a message request at 424. The archive HTTP server composes a message retrieval request based on the message request, and forwards the message retrieval request to the object database at 426. The object database again verifies repository access for the customer at 428.

If access is authorized, the object database sends a bitfile ID for each target electronic document to archiver 208 at 430. In one implementation, archiver 208 will accept a bitfile ID request only from object database 210. Because object database 210 verifies customer authorization before sending the bitfile ID to the archiver, security of the electronic documents is preserved. In response, the archiver returns a bitfile handle to the object database at 432.

The object database passes the bitfile handle to the archive HTTP server, which formulates a bitfile request. The bitfile request is sent to the archiver at 436. In response, the archiver sends the bitfile for the target electronic document to the archive HTTP server at 438. The archive HTTP server uses the bitfile to generate a formatted message, which is sent to the customer web browser at 440. The formatted message presents the requested target electronic document to the user on the customer's web browser.

In one implementation, the electronic document includes an HTML representation of the document on the screen. This representation can include hidden routing data, as specified by RFC821. The customer can obtain the original email used to archive the electronic document by emailing it to himself, downloading it to an application such as Notepad, or forwarding it to someone else. This is especially useful for delivering stop trade confirms to customers of on-line brokerages; in this application the timestamp of a confirm is crucial.

Figure 5:
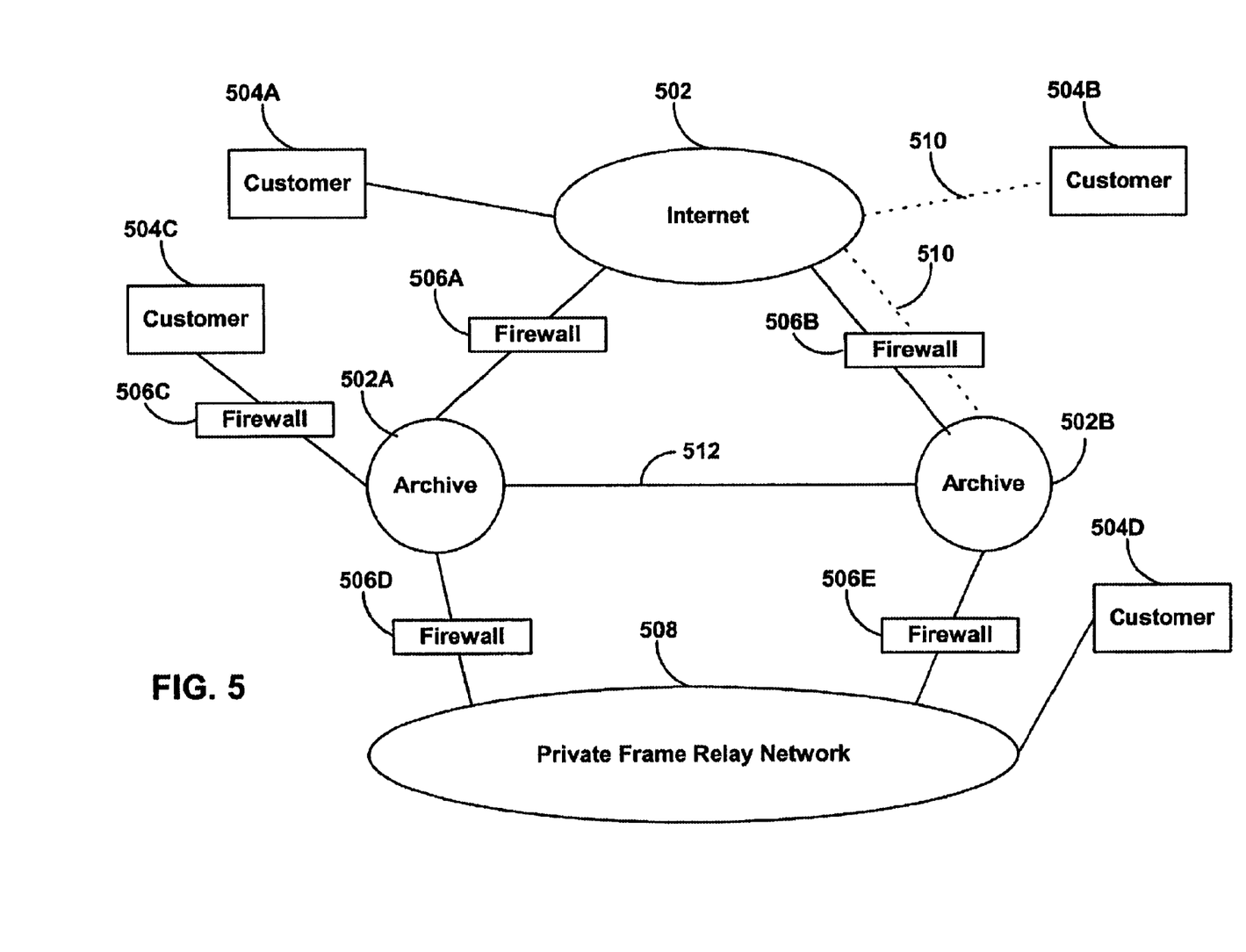
FIG. 5 is a context diagram depicting two archives.

In one implementation, multiple interconnected archives are provided. FIG. 5 is a context diagram depicting two archives 502A and 502B. The archives are connected by a private asynchronous transfer mode (ATM) backbone 512. Data is replicated between the two archives so that if one archive fails, the other can serve the customers. In addition, if the private ATM backbone goes down, the archives can operate independently. For enhanced security, access to each archive is protected by firewalls 506. For example, customer 504A connects to the archives via Internet 502. This connection is secured by firewalls 506A and 506B. Customer 504B accesses archive 502B using a virtual private network (VPN) 510. This connection is protected by firewall 506B. Customer 504C accesses archive 502A directly by a private connection. This connection is protected by firewall 506C. Customer 504D accesses the archives using a private frame relay network 508. This connection is protected by firewalls 506D and 506E.

Implementations of the present invention provide other security features. Each customer is allowed to select a level of security based upon its own needs. For example, these security mechanisms can include a logon/password using secure sockets layer (SSL), validating certificates, using soft or hard tokens, encryption, and the like. The firewalls prevent hackers from exploiting holes in the operating system. The authentication mechanisms described above prevent attacks at the application level, such as masquerade attacks. In one implementation, separate front end servers are used. In addition, the system back-end is insulated from the front-end by using separate servers. Finally, data stored on WORM disks can be stored in an encrypted manner.

Non-tamperability of archive data can be demonstrated by various methods. For example, the electronic documents can be stored on WORM disks, as required by the SEC. However, these disks could be maliciously substituted. According to one implementation, electronic documents are signed electronically as they enter the archive. Thus, non-tamperability can be shown by demonstrating that the digital signature is still intact.

Figure 6:
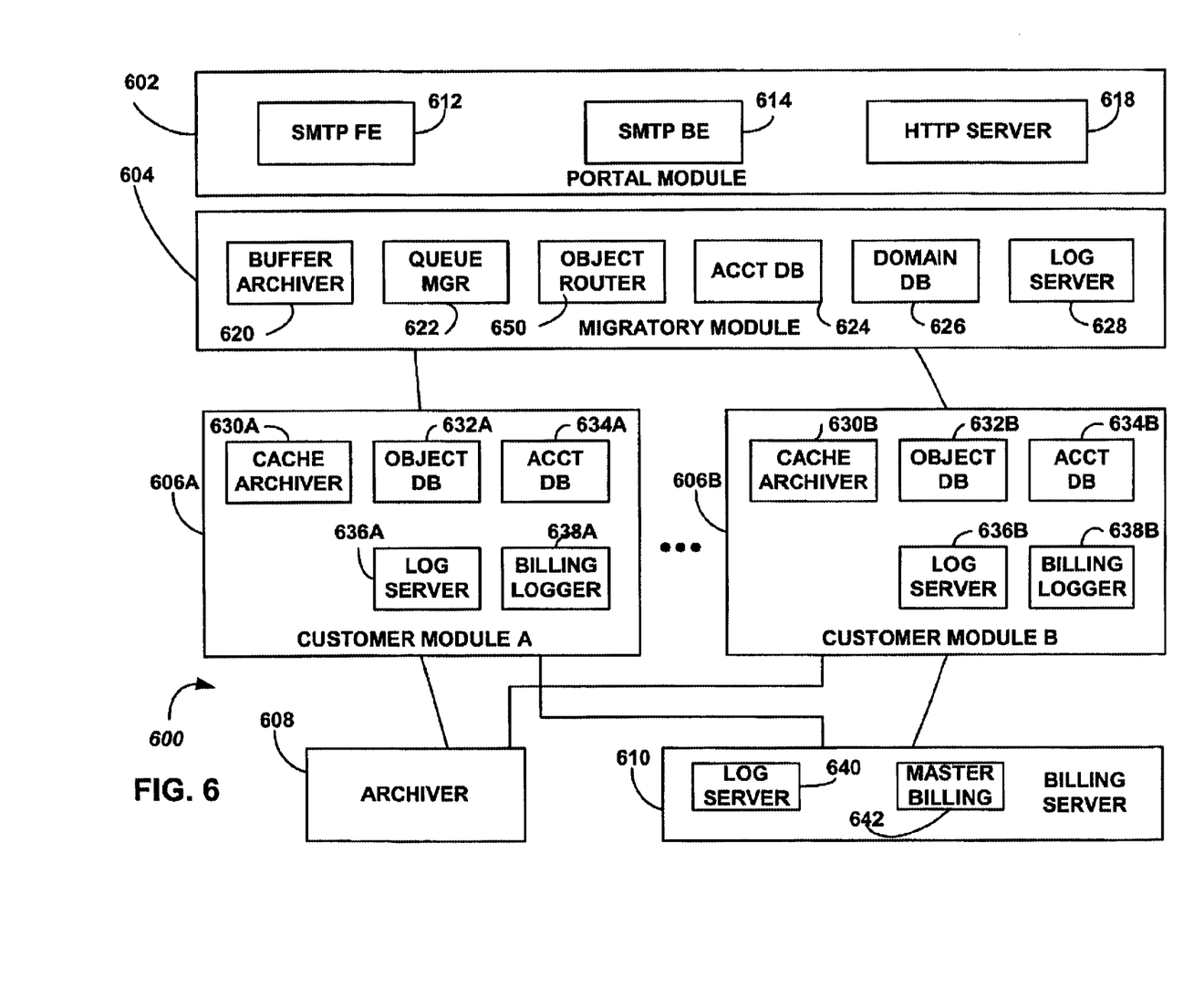
FIG. 6 is a block diagram depicting an implementation of an archive according to the present invention.

FIG. 6 is a block diagram depicting an implementation of an archive 600 according to the present invention. Archive 600 includes a portal module 602, a migratory module 604, an archiver module 608, a billing server 610, and customer modules 606A and 606B. The separation of portal module 602 and migratory module 604 permits greater scalability and also provides an additional ring for a "defense-in-depth" architecture for improved security. In one implementation, portal modules are permitted to communicate only with migratory modules. This provides an additional ring in the security architecture.

Portal module 602 includes an SMTP front-end (FE) 612, an SMTP back-end (BE) 614, and an HTTP server 618. The SMTP front-end handles incoming email, and the SMPT back-end handles outgoing email. The HTTP server handles HTTP communications, as described above.

The present invention provides two methods for obtaining electronic documents via email for archiving. According to the first method described above, the customer merely sends a copy of each email to the archive. According to a second method, however, the customer uses the archive 600 as a store-and-forward site for all of the customer's email to be archived. Email that is inbound to the customer is rerouted to the archive SMTP front-end using the MX record according to well-known techniques. Email that is outbound from the customer can simply be rerouted to the SMTP front-end of the archive. The migratory module includes a buffer archiver 620, a queue manager 622, an account database 624, a domain database 626, a log server 628, and an object router 650. When an email arrives at the SMTP front-end, a copy is sent to the buffer archiver, and a record of the email is placed in the queue manager. The queue manager permits scalability of the SMTP front-ends and back-ends. For example, queue manager permits multiple portal modules to be used, or alternatively, permits multiple SMTP front-ends and back-ends to be used within each portal module.

Domain database 626 contains a listing of customers and their associated domains. Object router 650 determines, using the domain database, which customer owns each incoming message. Based on this information, the object router causes the document to be transferred from buffer archiver 620 to the appropriate cache archiver 630 and the appropriate customer module 606. The document is eventually copied onto optical storage media and is also replicated to other archives within the system. The log server stores events such as security events and errors.

When a user logs in, the domain database uses the login information to direct the user to the appropriate account database. The web server authenticates with the account database and so determines which repositories the user is authorized to access. The account database performs user authentication and maintains an access control list for each repository.

The object database receives document descriptors, such as JavaBeans, XML DTD's (Document Type Descriptions), and the like, which create and populate repositories. In addition, the object database maps user queries to SQL queries to search the archiver.

Each customer module includes similar elements. For example, customer module 606A includes a cache archiver 630A, an object database 632A, and account database 634A, a log server 636A, and a billing logger 638A. Likewise, customer module 606B contains a cache archiver 630B, an object database 632B, and account database 634B, a log server 636B, and a billing logger 638B. The account database 634A performs functions similar to those of account database 624. Log server 636A performs functions similar to those performed by log server 628. Billing logger 638A collects billing events, which are fed to billing server 610. Billing server 610 includes a log server 640 for logging events, and a master billing unit 642 for preparing customer bills. Archiver 608 performs functions similar to those of archiver 208, as described above.

Figure 7:
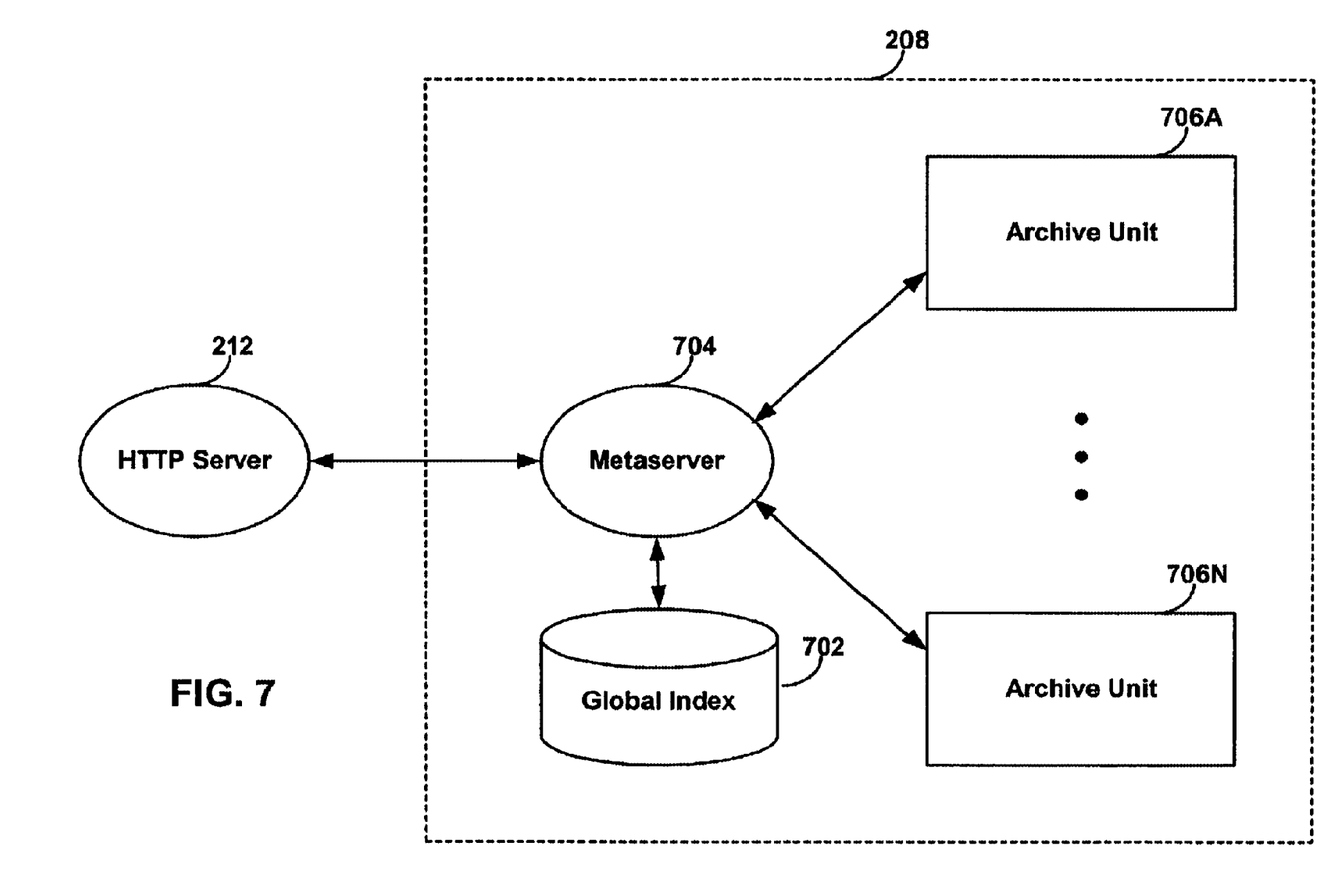
FIG. 7 depicts an archive according to one implementation of the invention.

Referring to FIG. 7, an archive 208 includes a metaserver 704 and a plurality of archive units 706A through 706N. Metaserver 704 provides communications between the HTTP server 212 and the archive units 706. Metaserver 704 can be implemented using a conventional server such as those well-known in the relevant arts. In one implementation, metaserver 704 and archive units 706 employ Jini™ network technology. This approach provides a simple infrastructure for delivering services in a network and for creating spontaneous interaction between programs that use these services regardless of their hardware/software implementation.

Archive 208 also includes a global index 702. In one implementation, each archive unit 706 occupies a cell 110 within storage space 100. Global index 702 locates each archive unit in the storage space. That is, global index 702 indicates the correspondence between the cells in the storage space and the archive units 706. Metaserver 704 uses the global index to determine the correspondence between archive units and cells in the storage space. In other implementations, the correspondence between cells and archive units can be many-to-one or one-to-many. Metaserver 704 uses the global index to determine the correspondence between archive units and cells in the storage space in these implementations as well. For clarity the implementation having one-to-one correspondence between archive units and cells in the storage space is described.

Figure 8:
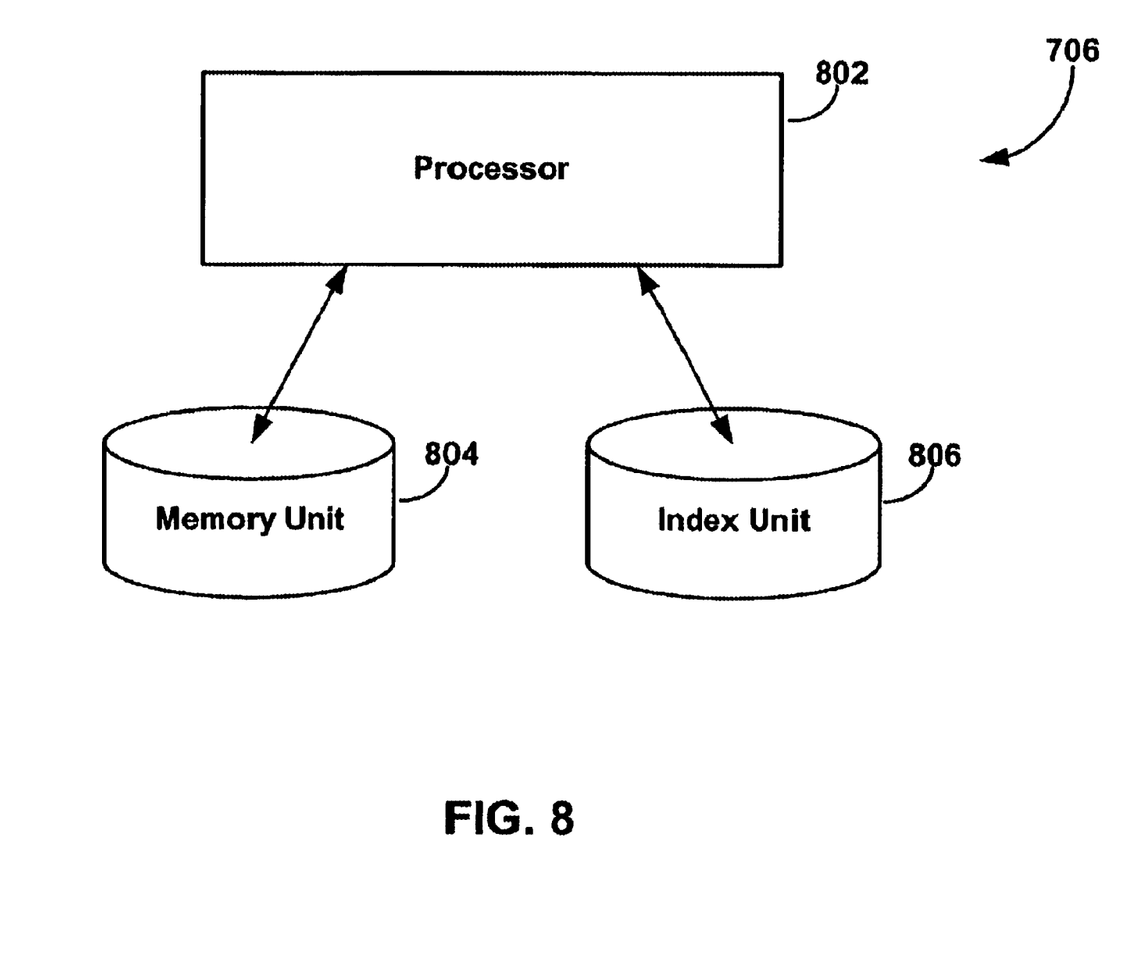
FIG. 8 depicts an archive unit according to one implementation of the invention.

Referring to FIG. 8, an archive unit 706 includes a processor 802, a memory unit 804, and an index unit 806. Processor 802 can be implemented as a conventional processor such as those well-known in the relevant arts. In one implementation, archive unit 706 is implemented as a small form factor personal computer running a Linux operating system. Each of memory unit 804 and index unit 806 can include a conventional storage structure, such as a hard disk drive, random-access memory, or the like, that is well-known. Memory unit 804 can occupy the same storage structure as index unit 806 or a separate storage structure. Electronic documents (also referred to herein as "data") are stored on memory unit 804. A local index describing the electronic documents is stored on index unit 806.

Figure 9:
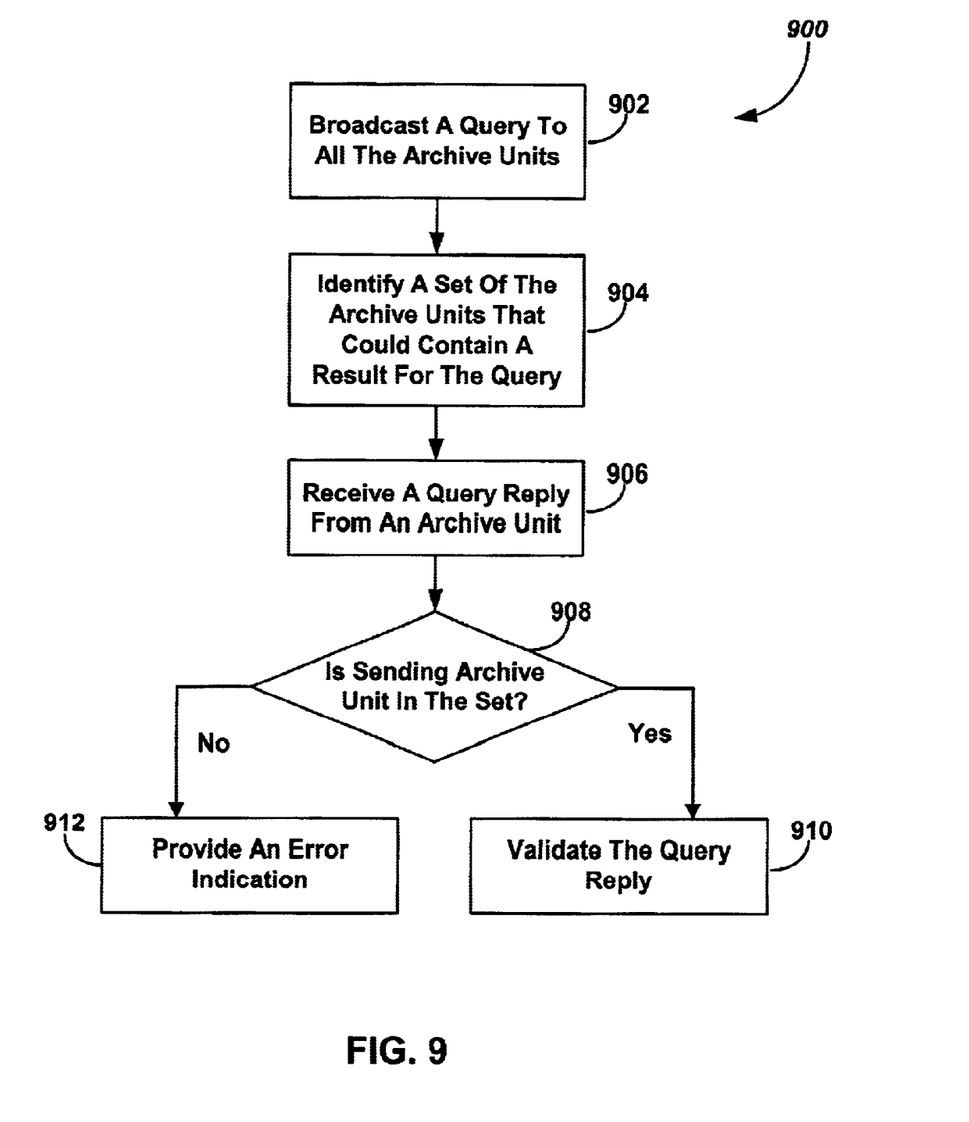
FIG. 9 depicts a process performed by a metaserver according to one implementation of the invention.

FIG. 9 depicts a process 900 performed by metaserver 704 according to one implementation. After receiving a query from the HTTP server 212, metaserver 704 broadcasts the query to all of the archive units 706 that are served by metaserver 704 (step 902). Metaserver 704 then identifies a set of archive units 706 that could contain a result for the query (step 904).

In one implementation, metaserver 704 identifies the set of archive units that could contain a result for the query by examining global index 702. For example, in one implementation the query specifies a bias data range and a metadata range. The specified ranges identify one or more cells in the global index. Each identified cell corresponds to an archive unit. The correspondence between cells and archive units is given by the global index. The metaserver identifies the set of archive units that could contain a result for the query by examining the global index to find the archive units that correspond to the cells identified by the bias data and metadata ranges specified by the query.

The archive units evaluate the query. At least one of the archive units replies to the query. Metaserver 704 receives a reply to the query from at least one of the archive units (step 906). For each archive unit that sent a reply, metaserver 704 determines whether that archive unit could contain a reply to the query. That is, metaserver 704 determines whether the archive unit is in the identified set (step 908). If the archive unit is in the identified set, metaserver 704 validates the query reply (step 910). In one implementation, validating includes sending the query reply to the HTTP server 212. If the archive unit is not in the identified set, metaserver 704 provides an error indication (step 912).

Figure 10:
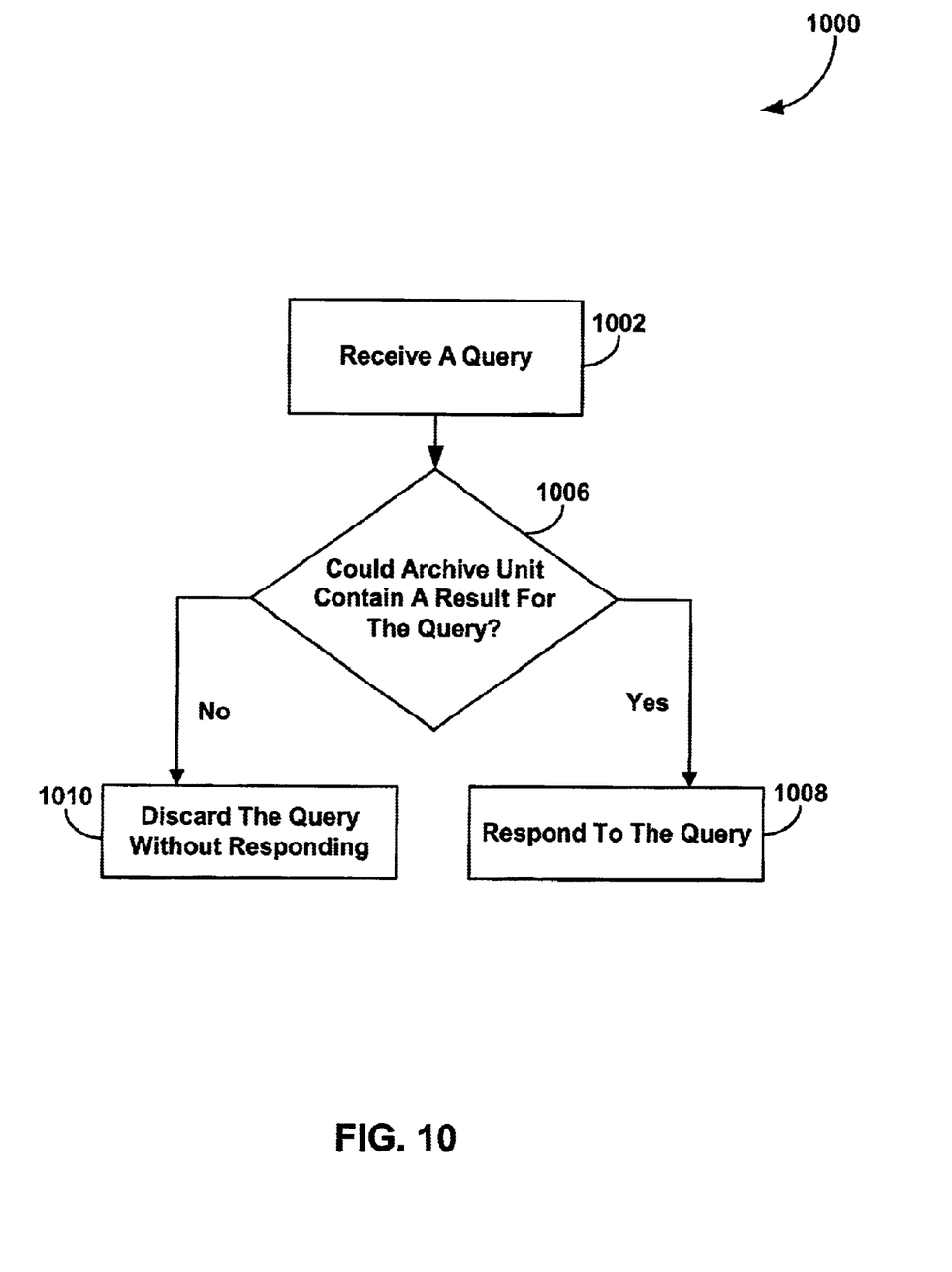
FIG. 10 depicts a process performed by an archive unit according to one implementation of the invention.

FIG. 10 depicts a process 1000 performed by an archive unit 706 according to one implementation. The archive unit receives a query from a metaserver 704 (step 1002). The archive unit examines its local index (that is, the contents of its index unit 806) to determine whether its memory unit 804 could contain a result for the query (step 1006). The local index describes the electronic documents stored on the archive unit's memory unit.

In one implementation, the local index locates each archive unit in the storage space. That is, the local index indicates the correspondence between the cells in the storage space and the archive unit. Processor 802 uses the local index to determine the correspondence between the archive unit and the cells in the storage space. In other implementations, the correspondence between cells and the archive unit can be many-to-one. Processor 802 uses the local index to determine the correspondence between the archive unit and cells in the storage space in these implementations as well.

For example, in one implementation the query specifies a bias data range and a metadata range. The specified ranges identify one or more cells in the local index. The correspondence between cells and the archive unit is given by the local index. Processor 802 determines whether the archive unit could contain a result for the query by comparing to the local index the bias data and metadata ranges specified by the query. Processor 802 finds the cells identified by the bias data and metadata ranges specified by the query, and determines whether any of those cells correspond to the archive unit.

If any cells identified by the bias data and metadata ranges specified by the query correspond to the archive unit, the archive unit could contain a result for the query. Therefore, the archive unit responds to the query in the manner described above (step 1008).

If none of the cells identified by the bias data and metadata ranges specified by the query correspond to the archive unit, the archive unit could not contain a result for the query. Therefore, the archive unit discards the query without responding to metaserver 704 (step 1010).

The above implementation is described in terms of archiving email messages. However, the present invention is easily extended to implementations that accommodate other types of electronic documents, as would be apparent to one skilled in the relevant arts. For example, the present invention contemplates implementations for archiving electronic documents transmitted according to protocols including HTML, EDI, FTP, XML, and the like.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the invention have been described. Nevertheless, it will be understood that various modifications may be made without departing from the spirit and scope of the invention. Accordingly, other embodiments are within the scope of the following claims.

What is claimed is:

1. A computer program product, tangibly stored on a computer-readable medium, for locating data in a system including a plurality of archive units, comprising instructions operable to cause a programmable processor to:

broadcast a query to all the archive units;

identify a set of the archive units that could contain a result for the query;

receive at least one query reply from the archive units; and validate the query reply when the archive unit that sent the query reply is in the set.

2. The computer program product of claim 1, further comprising instructions operable to cause a programmable processor to:

provide an error indication when a query reply is not received from one of the archive units in the set.

3. A computer program product, tangibly stored on a computer-readable medium, for locating data in a system including a plurality of archive units and a storage map, wherein the storage map locates the archive units in a multi-dimensional storage space having a metadata axis and a bias data axis, comprising instructions operable to cause a programmable processor to:

broadcast a query to all the archive units;

identify a set of the archive units that fall within a bias data range and a metadata range specified by the query;

receive at least one query reply from the archive units; and validate the query reply when the archive unit that sent the query reply is in the set.

4. The computer program product of claim 3, further comprising instructions operable to cause a programmable processor to:

provide an error indication when a query reply is not received from one of the archive units in the set.

5. A method for locating data in a system including a plurality of archive units, the method comprising:

broadcasting a query to all the archive units;

identifying a set of the archive units that could contain a result for the query;

receiving at least one query reply from the archive units; and validating the query reply when the archive unit that sent the query reply is in the set.

6. The method of claim 5, further comprising:

providing an error indication when a query reply is not received from one of the archive units in the set.

7. A method for locating data in a system including a plurality of archive units and a storage map, wherein the storage map locates the archive units in a multi-dimensional storage space having a metadata axis and a bias data axis, the method comprising: broadcasting a query to all the archive units;

identifying a set of the archive units that fall within a bias data range and a metadata range specified by the query;

receiving at least one query reply from the archive units; and validating the query reply when the archive unit that sent the query reply is in the set.

8. The method of claim 7, further comprising:

providing an error indication when a query reply is not received from one of the archive units in the set.

9. An apparatus comprising:

a plurality of archive units; and a metaserver configured to broadcast a query to all the archive units, identify a set of the archive units that could contain a result for the query, receive a query reply from at least one of the archive units, and validate the query reply when the archive unit that sent the query reply is in the set.

10. An apparatus for archiving data comprising:

a plurality of archive units; and a metaserver having a storage map locating the archive units in a multi-dimensional storage space having a metadata axis and a bias data axis, the metaserver configured to broadcast a query to all the archive units, identify a set of the archive units that fall within a metadata range and a bias data range specified by the query, receive a query reply from at least one of the archive units, and validate the query reply when the archive unit that sent the query reply is in the set.

* * * * *